United States Patent [19]
Smith

[11] Patent Number: 6,073,964
[45] Date of Patent: Jun. 13, 2000

[54] TRUCK BODY PROTECTOR SYSTEM

[76] Inventor: Daniel J. Smith, 4772 Shepard Rd., Marcellus, N.Y. 13108

[21] Appl. No.: 09/109,153

[22] Filed: Jul. 2, 1998

[51] Int. Cl.$^7$ ...................................................... B60R 9/02
[52] U.S. Cl. ............................................................ 280/770
[58] Field of Search ....................... 296/98, 32; 150/166; 160/23.1, 370.22; 280/770

[56] References Cited

U.S. PATENT DOCUMENTS

| | | | |
|---|---|---|---|
| 4,997,227 | 3/1991 | Falzone et al. | 296/39.2 |
| 5,788,307 | 8/1998 | Gilbert | 296/32 |
| 5,944,372 | 8/1999 | Gilbert | 296/37.6 |

*Primary Examiner*—Kevin Hurley
*Assistant Examiner*—Andrew J. Fischer

[57] ABSTRACT

A truck body protector system including a bracket secured to at least one side wall. The bracket includes a hinge formed of a plurality of hinge plates secured to the interior face of a side wall at spaced locations by screws and a plurality of rotatable hinge plates with a common hinge rod secured to the rotatable hinge plate for coupling the rotatable hinge plate to the fixed hinge plate and with an elongated support plate secured to the rotatable hinge plate by spaced screws at spaced locations along their common extents. The rotatable hinge plate and support plate are movable at a stowed orientation above the chamber and an operative position exterior of the truck bed and spaced from the side wall. The support face is formed in an L-shaped configuration with apertures at its end remote from the hinge rod. A sheet of durable, flexible plastic material in a generally rectangular configuration with a length essential to the length of the trailer and a height greater than that of the side walls sufficient to cover the tires of the truck and with spaced holes along its upper edge. Also provided is a plurality of S-shaped connectors removably coupling the sheet to the support plate.

5 Claims, 3 Drawing Sheets

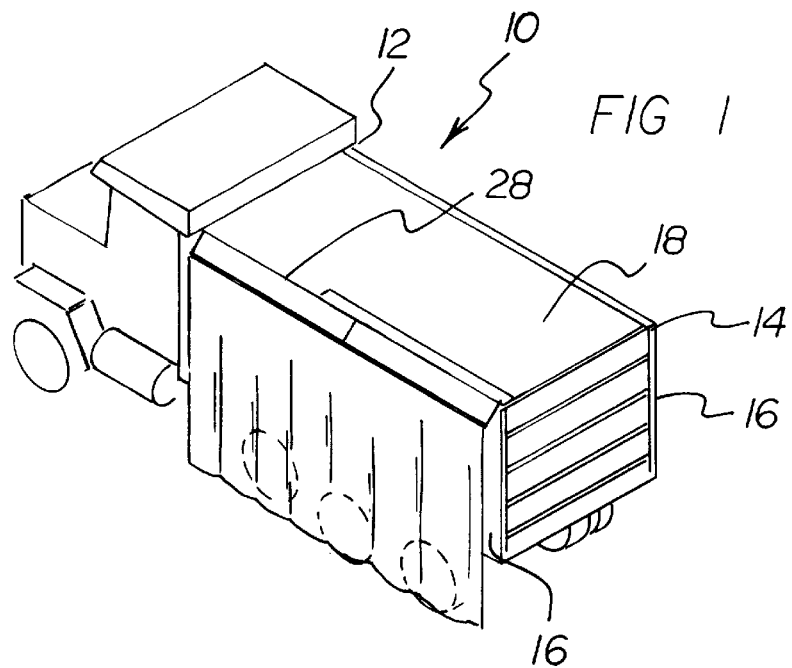
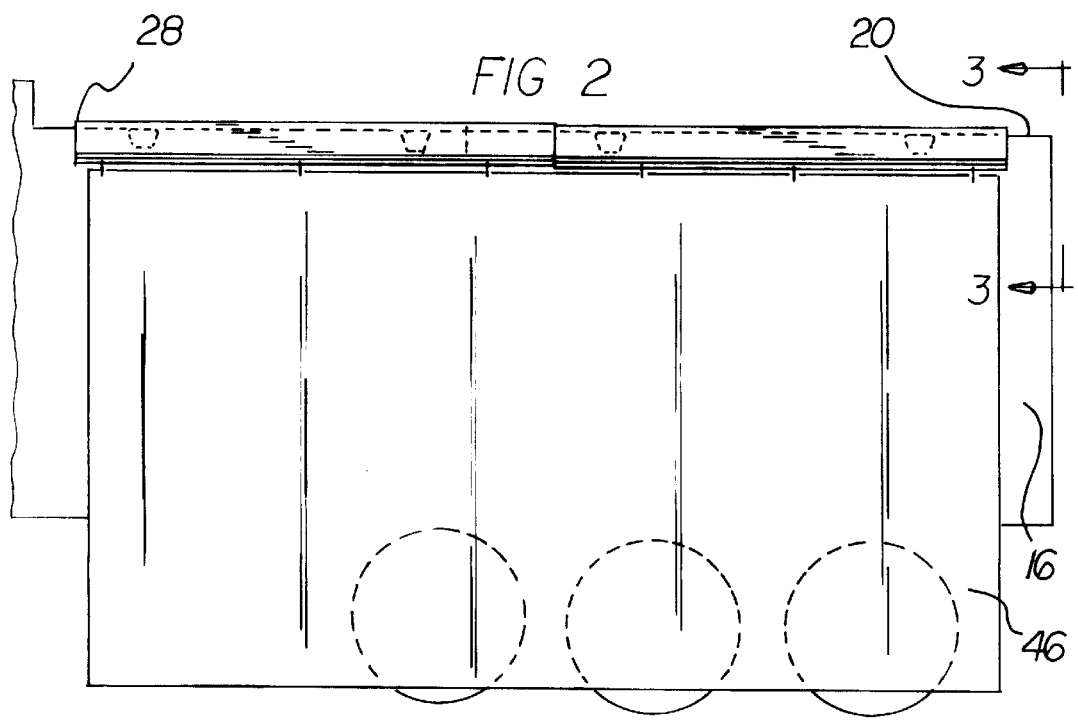

TRUCK BODY PROTECTOR SYSTEM

BACKGROUND OF THE INVENTION

1. Field of the Invention

The present invention relates to a truck body protector system and more particularly pertains to precluding truck body side walls from damage from debris while filling the truck.

2. Description of the Prior Art

The use of truck accessories of known designs and configurations is known in the prior art. More specifically, truck accessories of known designs and configurations heretofore devised and utilized for the purpose of protecting trucks from debris through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,520,442 to Kisami et al. discloses a Protective Device of a Driver's Cab Front of Large-Size Dump Truck. U.S. Pat. No. 5,642,971 to Ragsdale et al. discloses a Rail System for Pick-Up Truck Beds. U.S. Pat. No. 5,431,472 to Coffland discloses a Convertible Pickup Side Rail Apparatus. U.S. Pat. No. 4,604,013 to Elwell et al. Discloses a Vehicle Side Rail Assembly. U.S. Pat. No. 4,253,785 to Bronstein discloses a Pick-Up Truck Edge Protector and Anchor Member. Lastly, U.S. Pat. No. 4,440,333 to Bott discloses an Article Carrier for Automotive Vehicles.

In this respect, the truck body protector system according to the present invention substantially departs from the conventional concepts and designs of the prior art, and in doing so provides an apparatus primarily developed for the purpose of for precluding truck body side walls from damage from debris while filling the truck.

Therefore, it can be appreciated that there exists a continuing need for a new and improved truck body protector system which can be used for precluding truck body side walls from damage from debris while filling the truck. In this regard, the present invention substantially fulfills this need.

SUMMARY OF THE INVENTION

In view of the foregoing disadvantages inherent in the known types of truck accessories of known designs and configurations now present in the prior art, the present invention provides an improved truck body protector system. As such, the general purpose of the present invention, which will be described subsequently in greater detail, is to provide a new and improved truck body protector system and method which has all the advantages of the prior art and none of the disadvantages.

To attain this, the present invention essentially comprises a new and improved truck body protector system for precluding truck body side walls from damage from debris while filling the truck. The system is for use with a truck body having parallel side walls forming a chamber therebetween for the receipt of debris to be transported by the truck, each side wall having a top edge with an interior base and an exterior base.

An elongated bracket is secured to each side wall. Each bracket includes a hinge formed of a plurality of hinge plates secured to the interior face of a side wall at spaced locations by screws and a plurality of rotatable hinge plates with a common hinge rod secured to the rotatable hinge plate for coupling the rotatable hinge plate to the fixed hinge plate and with an elongated support plate secured to the rotatable hinge plate by spaced screws at spaced locations along their common extents. The rotatable hinge plate and support plate are movable a stowed orientation above the chamber and an operative position exterior of the truck bed and spaced from the side wall. The support face is formed in an L-shaped configuration with apertures at its end remote from the hinge rod.

A sheet of durable, flexible plastic material is provided in a generally rectangular configuration with a length essential to the length of the trailer and a height greater than that of the side walls sufficient to cover the tires of the truck and with spaced holes along its upper edge.

A plurality of S-shaped connectors removably couple the sheet to the support plate.

A motor with a drive gear is operatively coupled to a drive gear on the hinge rod for automatically moving the hinge plate and supplemental plate between the stowed orientation and the operative orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved truck body protector system which has all of the advantages of the prior art truck accessories of known designs and configurations and none of the disadvantages.

It is another object of the present invention to provide a new and improved truck body protector system which may be easily and efficiently manufactured and marketed.

It is further object of the present invention to provide a new and improved truck body protector system which is of durable and reliable constructions.

An even further object of the present invention is to provide a new and improved truck body protector system which is susceptible of a low cost of manufacture with regard to both materials and labor, and which accordingly is then susceptible of low prices of sale to the consuming public, thereby making such truck body protector system economically available to the buying public.

Even still another object of the present invention is to provide a truck body protector system for precluding truck body side walls from damage from debris while filling the truck.

Lastly, it is an object of the present invention to provide a new and improved truck body protector system including a bracket secured to at least one side wall. The bracket includes a hinge formed of a plurality of hinge plates secured to the interior face of a side wall at spaced locations by screws and a plurality of rotatable hinge plates with a common hinge rod secured to the rotatable hinge plate for coupling the rotatable hinge plate to the fixed hinge plate and with an elongated support plate secured to the rotatable hinge plate by spaced screws at spaced locations along their common extents. The rotatable hinge plate and support plate are movable at a stowed orientation above the chamber and an operative position exterior of the truck bed and spaced from the side wall. The support face is formed in an L-shaped configuration with apertures at its end remote from the hinge rod. A sheet of durable, flexible plastic material in a generally rectangular configuration with a length essential to the length of the trailer and a height greater than that of the side walls sufficient to cover the tires of the truck and with spaced holes along its upper edge. Also provided is a plurality of S-shaped connectors removably coupling the sheet to the support plate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the truck body protector system constructed in accordance with the principles of the present invention.

FIG. 2 is a side elevational view of the rear portion of the truck shown in FIG. 1.

The same reference numerals refer to the same parts through the various Figures.

DESCRIPTION OF THE PREFERRED EMBODIMENT

Figure 3:
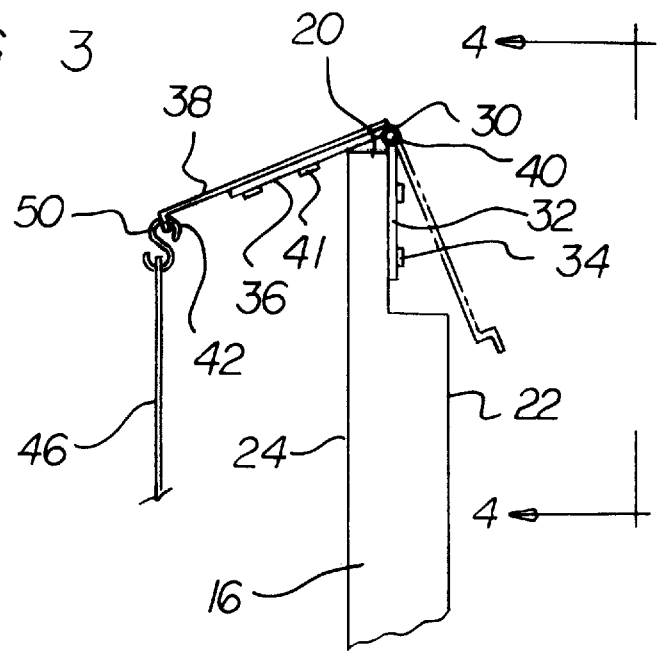
FIG. 3 is a cross-sectional view taken along line 3—3 of FIG. 2.
Figure 4:
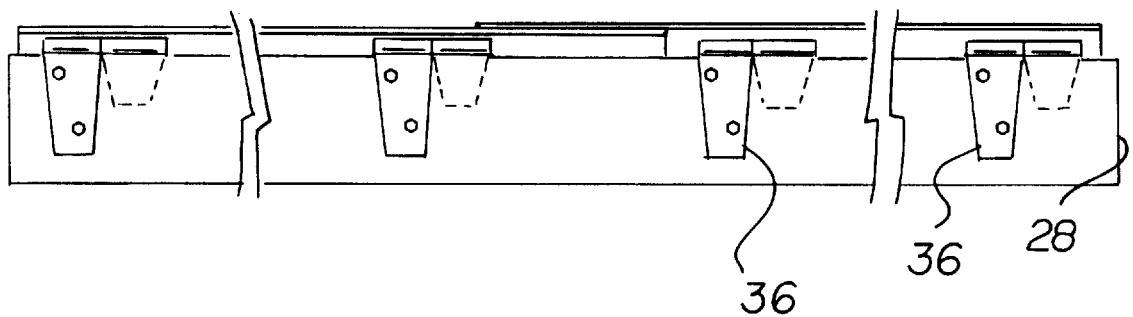
FIG. 4 is a front elevational view of the truck shown in the prior Figures taken along line 4—4 of FIG. 3.
Figure 5:
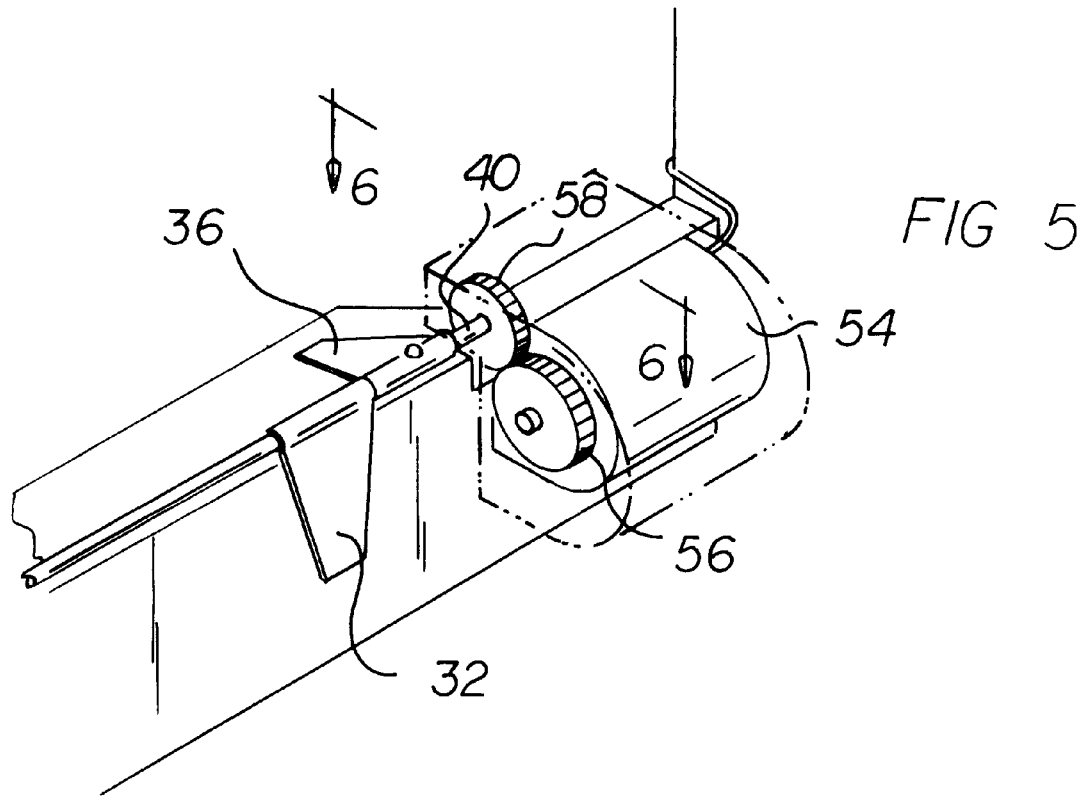
FIG. 5 is a perspective illustration of an alternate embodiment of the present invention.
Figure 6:
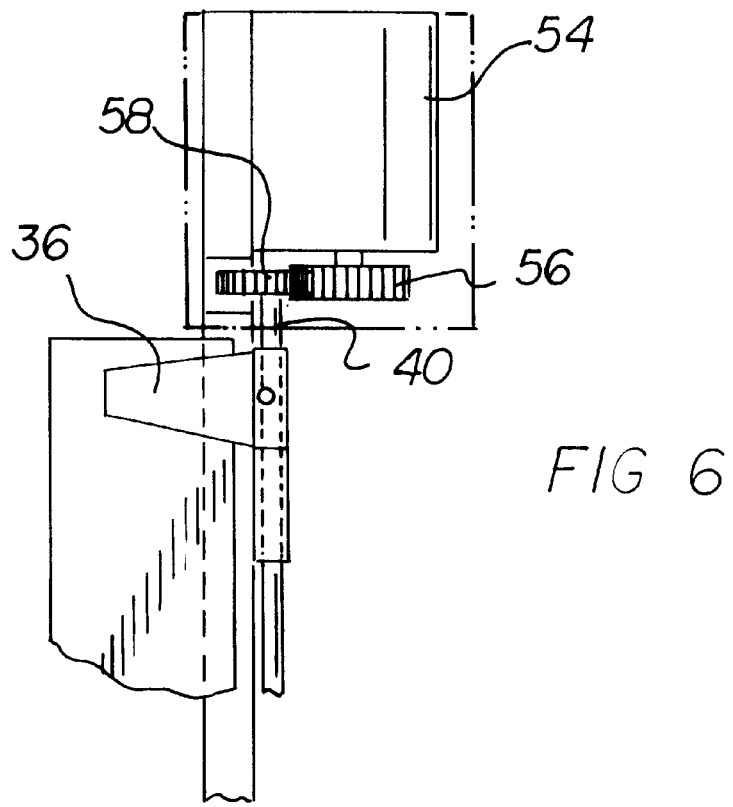
FIG. 6 is a cross-sectional view taken along line 6—6 of FIG. 5.

With reference now to the drawings, and in particular to FIG. 1 thereof, the preferred embodiment of the new and improved truck body protector system embodying the principles and concepts of the present invention and generally designated by the reference numeral 10 will be described.

The present invention, the truck body protector system 10 is comprised of a plurality of components. Such components are individually configured and correlated with respect to each other so as to attain the desired objective.

The new and improved truck body protector system for precluding truck body side walls from damage from debris while filling the truck comprises a truck with a cab and a trailer with parallel side walls forming a chamber 18 therebetween for the receipt of debris to be transported by the truck. Each side wall has a top edge 20 with an interior base and an exterior base. An elongated bracket 30 is secured to each side wall. Each bracket includes a hinge formed of a plurality of hinge plates 32 secured to the interior face of a side wall at spaced locations by screws 34 (⅜ bolt, for example) and a plurality of rotatable hinge plates 36 with a common hinge rod 40 (⅝ rod, for example) secured to the rotatable hinge plate for coupling the rotatable hinge plate to the fixed hinge plate. An elongated support plate 38 is secured to the rotatable hinge plate by spaced screws 41 (10–32 bolt or ¼ bolt, for example) at spaced locations along their common extents.

Alternately, the bracket can be formed of two overlapping members for allowing the bracket to be extended to fit a variety of truck body side walls.

The rotatable hinge plate and support plate are movable a stowed orientation above the chamber and an operative position exterior of the truck bed and spaced from the side wall.

The support face is formed in an S-shaped configuration 50 with apertures at its end remote from the hinge rod. A sheet 46 is formed of durable, flexible plastic material in a generally rectangular configuration with a length essential to the length of the trailer and a height greater than that of the side walls sufficient to cover the tires of the truck and with spaced holes 48 long its upper edge. A plurality of S-shaped connectors 42 removably couple the sheet to the support plate.

A motor 54 with a drive gear 56 is operatively coupled to a drive gear 58 on the hinge rod for automatically moving the hinge plate and supplemental plate between the stowed orientation and the operative orientation.

When loading dirt, sand, gravel, etc. into a dump truck trailer, debris can fall on the side of the dump truck or trailer. This debris results in chips, scratches and other body damage to the truck bed side or truck wheels. Hence, the system of the present invention saves truck rims from damage due to such falling objects that occur from spillage. The system saves the truck owner time and money typically spent on repainting and/or body repair work.

The present system comprises a flip-out deflector that is inside the truck when traveling and outside the truck when filling. It should be noted that the system does not interfere with most tarp systems used in covering truck bodies because of the pivoting action. The truck body protector system is fully adjustable to fit trucks of many sizes.

Debris is channeled away from the truck bed side and wheels when the system of the present invention is used. The body protector runs the full length of the truck and trailer to any length and is attached with hinges. The hinges are of ¼" steel being 2" in width and 6" to 8" in length with a ⅝" bolt bolted to the body side or side board. The protector comes in adjustable lengths with a width of 9½" wide with a ¾" lip edge. Trucks are loaded from the driver side so only one body protector is needed.

The truck protector is not limited to tractor trailers but may be used with all size truck bodies. The construction is preferably stainless steel, 14 of 16 gauge, for maintenance free, lightweight use and will not rust. It could also be constructed of plastic or mild steel. An optional curtain hangs from the body protector for added protection to the body, wheels, etc. Savings in time are provided to the user of yearly repainting or repolishing of the body, wheels, etc. The body protector mounting is preferably with ⅜×1½ lag bolts for wood mounting and ⅜×1½ self tapping bolts for metal or aluminum mounting. Operation of the body protector may be done manually or, optional, motorized. The body protector is rectangular shaped and variable in length by overlapping of pieces to fit all sizes or lengths truck body sizes. Separate hinge rods are preferable for manual operation, one-piece if motorized. If the invention is to be motorized, the gears would have to be enclosed in a vertical manner. Otherwise, stones or dirt would make the device bind and not operable. A miter box gear motor is best.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved truck body protector system for precluding truck body side walls from damage from debris while filling the truck, wherein the truck to be protected has parallel side walls forming a chamber therebetween for the receipt of debris to be transported by the truck, each side wall having a top edge with an interior base and an exterior base, the truck body protector system comprising, in combination:

an elongated bracket secured to each side wall, each bracket including a hinge formed of a plurality of hinge plates secured to the interior face of a side wall at spaced locations by screws and a plurality of rotatable hinge plates with a common hinge rod secured to the rotatable hinge plate for coupling the rotatable hinge plate to the fixed hinge plate and with an elongated support plate secured to the rotatable hinge plate by spaced screws at spaced locations along their common extents, the rotatable hinge plate and support plate being movable a stowed orientation above the chamber and an operative position exterior of the truck bed and spaced from the side wall, the support face being formed in an L-shaped configuration with apertures at its end remote from the hinge rod;

a sheet of durable, flexible material in a generally rectangular configuration with a length essential to the length of the trailer and a height greater than that of the side walls sufficient to cover the tires of the truck and with spaced holes along its upper edge;

a plurality of S-shaped connectors removably coupling the sheet to the support plate; and a motor with a drive gear operatively coupled to a drive gear on the hinge rod for automatically moving the hinge plate and supplemental plate between the stowed orientation and the operative orientation.

2. The system as claimed in claim 1 wherein said bracket is formed of two overlapping members for allowing the bracket to be extended to fit a variety of truck side walls.

3. A truck body protector system for use with a truck having side walls forming a cargo compartment comprising:

a bracket secured to at least one side wall, the bracket including a hinge formed of a plurality of hinge plates secured to the interior face of a side wall at spaced locations by screws and a plurality of rotatable hinge plates with a common hinge rod secured to the rotatable hinge plate for coupling the rotatable hinge plate to the fixed hinge plate and with an elongated support plate secured to the rotatable hinge plate by spaced screws at spaced locations along their common extents, the rotatable hinge plate and support plate being movable a stowed orientation above the chamber and an operative position exterior of the truck bed and spaced from the side wall, the support face being formed in an L-shaped configuration with apertures at its end remote from the hinge rod;

a sheet of durable, flexible material in a generally rectangular configuration with a length essential to the length of the side walls and a height greater than that of the side walls sufficient to cover the tires of the truck and with spaced holes along its upper edge; and a plurality of S-shaped connectors removably coupling the sheet to the support plate.

4. The system as claimed in claim 3 further comprising a motor with a drive gear operatively coupled to a drive gear on the hinge rod for automatically moving the hinge plate and supplemental plate between the stowed orientation and the operative orientation.

5. The system as claimed in claim 3 wherein said bracket is formed of two overlapping members for allowing the bracket to be extended to fit a variety of truck side walls.

* * * * *